Aug. 1, 1944.   J. PEZZANO   2,354,700
VEHICLE BODY AND FRAME
Filed April 16, 1942   2 Sheets-Sheet 1

INVENTOR,
Joseph Pezzano
BY
Victor J. Evans & Co.
ATTORNEYS

Aug. 1, 1944.　　　　J. PEZZANO　　　　2,354,700
VEHICLE BODY AND FRAME
Filed April 16, 1942　　2 Sheets-Sheet 2
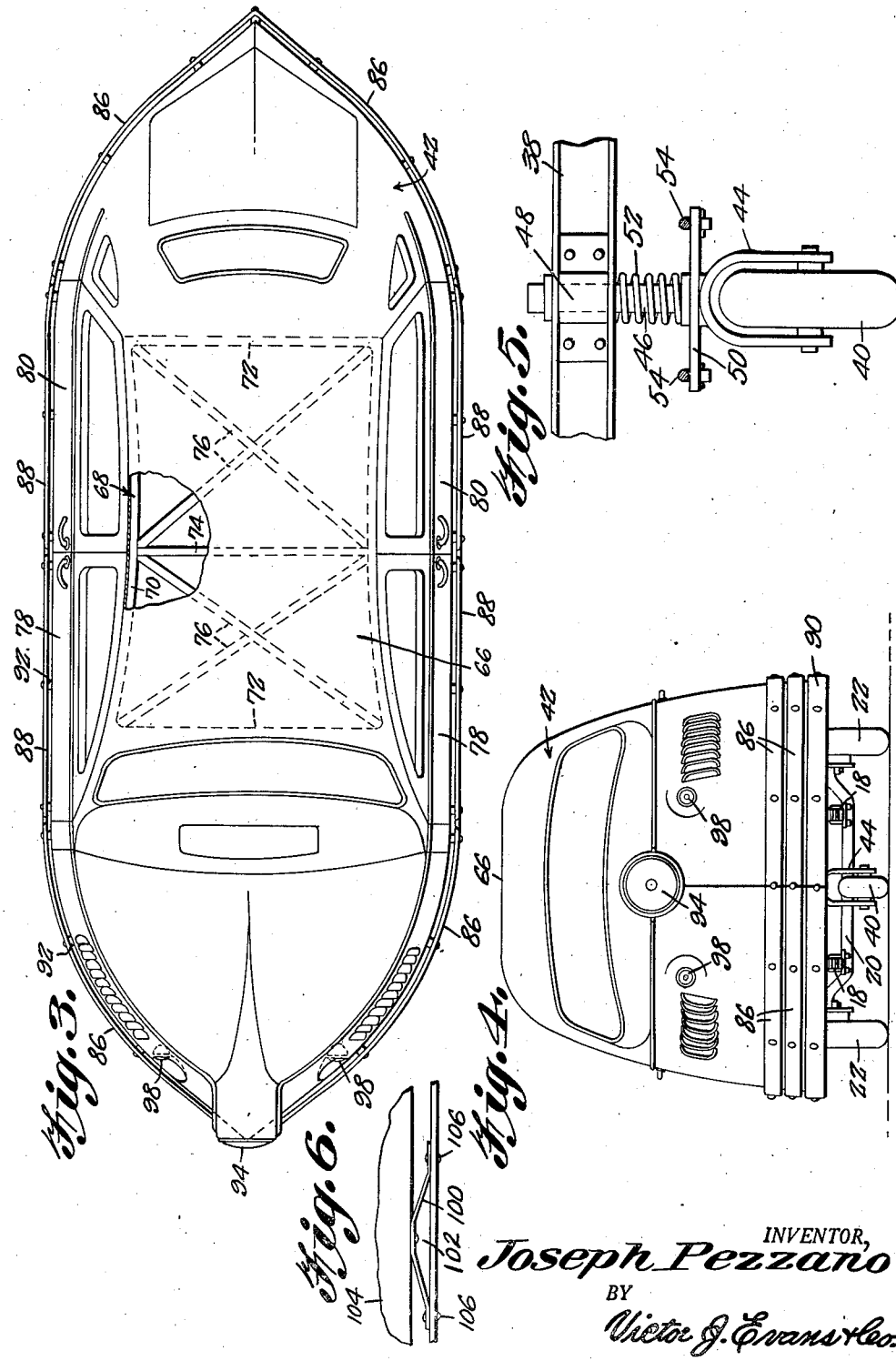
INVENTOR,
Joseph Pezzano
BY
Victor J. Evans & Co.
ATTORNEYS Patented Aug. 1, 1944

2,354,700

UNITED STATES PATENT OFFICE 2,354,700

VEHICLE BODY AND FRAME

Joseph Pezzano, Mariners Harbor,
Staten Island, N. Y.

Application April 16, 1942, Serial No. 439,262

2 Claims. (Cl. 293—57)

My invention relates to automotive vehicles such as automobiles, trucks and the like and has among its objects and advantages the provision of an improved body design, frame structure, and steering wheel arrangement.

In the accompanying drawings:

Figure 3 is a top view partly in section;

Figure 4 is a front view;

Figure 5 is a view of a third front wheel; and

Figure 6 is a view of a bumper spacer.

Figure 1:
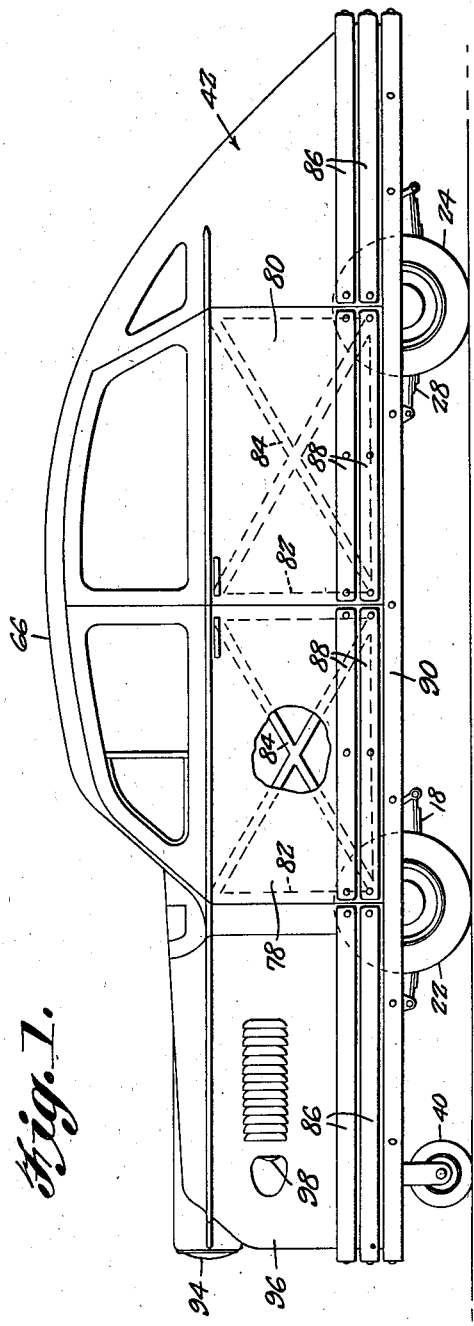
Figure 1 is a side view of a vehicle in accordance with my invention.

In the embodiment selected for illustration, I make use of a frame comprising two members 10 joined at their ends, as by welding, and bent to provide a tapered front end 12 and a correspondingly tapered rear end 14. Front frame members 16 extend transversely of the frame structure and are welded to the members 10. Two front springs 18 are mounted on the members 16 and carry the front axle 20 supported by the front wheels 22. The rear wheels 24 are mounted on a rear axle structure 26 in the usual manner, and the axle structure carries rear springs 28 connected with two cross frame members 30 welded to the members 10.

Diagonal frame members 32 are welded to one of the members 16 and one of the members 30 and to a fifth cross member 34 welded to the members 10. Diagonal members 36 are welded to the other of the members 16 and 30 and to the members 10. A sixth cross member 38 is welded to the members 10 and serves as a mount for a third front wheel 40 affording additional support for the front end of the vehicle, since the front wheels 22 are set back a considerable distance to accommodate the tapered front end contour of the frame and the vehicle body. In plan, the body 42 of the vehicle has the same contour as the frame structure.

Figure 2:
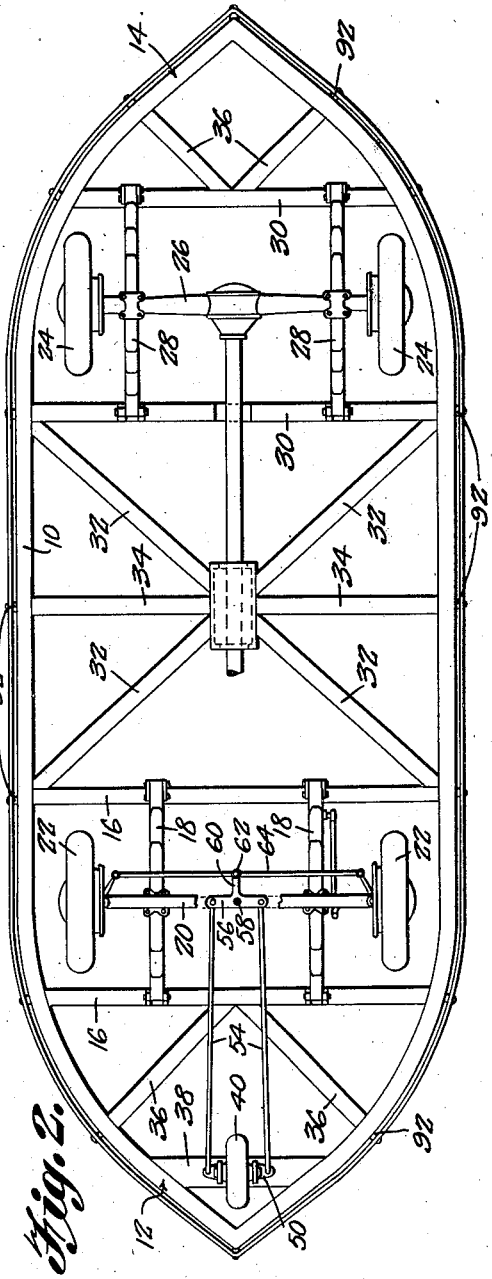
Figure 2 is a bottom view.

In Figure 5, the wheel 40 is carried in a yoke 44 having a vertical shaft 46 rotatably supported in a bearing 48 attached to the member 38. To the yoke 44 is fixedly connected a steering gear bar 50 serving as a support for a compression spring 52 engaging the member 38 to yieldingly press the wheel against the road surface. Two rods 54 are pivotally connected with the bar 50 and with a bar 56, see Figure 2, pivotally connected at 58 with the front axle 20. An arm 60 attached to the bar 56 is pivotally connected at 62 with the usual cross rod 64 for turning the front wheels of automobiles and which is operatively connected with the wheels 22. Thus turning of the front wheels 22 also imparts turning movement to the third front wheel 40.

Figures 3 and 4 illustrate the body 42 as tapering inwardly in an upward direction. The top structure 66 includes a generally rectangular frame 68 made up of side members 70 welded to two end cross members 72 and an intermediate member 74, all of which members are reinforced by diagonal members 76 welded thereto.

Each front door 78 and rear door 80 is provided with sturdy frame members 82 interconnected by diagonal braces 84 welded thereto. Bumper bars 86 are secured to the sides and front and rear ends of the body 42. Similar bumper bars 88 are secured to and extend across the front and rear doors 78 and 80 in line with the bumper bars 86. A continuous bumper bar 90 is secured to the frame structure of the vehicle comprising the members 10 and their interconnected bracing. All the bumper bars 86, 88 and 90 lie in a common plane when viewed according to Figures 2 and 3, and the bars are spaced laterally from the vehicle by spacers 92.

A bright headlamp 94 is streamlined into the nose of the hood 96, and two smaller power lamps 98 are set in the hood, which smaller lamps are suitable for city driving.

A vehicle of the foregoing description permits closer end to end parking in that the tapered contour facilitates maneuvering of the vehicle from a closely parked position. Protection is also afforded against damage from striking other vehicles, and two such vehicles may rub side to side without causing any damage. Then, too, there is much less danger of serious head-on collisions, since in most cases the vehicles would strike in a glancing manner.

Figure 6 illustrates a modified form of spacer for the bumper bars. This spacer comprises a sturdy but resilient member 100 which is riveted or bolted at 102 to the vehicle frame or body 104 intermediate the ends of the member 100, with the ends of the member bolted or riveted at 106 to its respective bumper bar.

Without further elaboration, the foregoing will so fully illustrate my invention, that others may, by applying current knowledge, readily adapt the same for use under various conditions of service.

I claim:

1. An automotive vehicle comprising a frame structure and a body having forwardly and rearwardly tapered front and rear ends, respectively, bumper means extending about the sides and front and rear ends of the frame structure and the body, said bumper means comprising in part one bar extending completely about said frame structure, and the remainder of the bumper means comprising vertically spaced bars spaced vertically of said one bar and secured to the body and doors.

2. In an automotive vehicle, a wheeled frame, a body mounted on the frame, bumper means extending about the sides, front and rear of the frame and body, said bumper means including a bar extending continuously about the frame, and a plurality of bars approximately parallel with and spaced vertically above said continuous bar and secured to the body and the doors thereof.

JOSEPH PEZZANO.